(12) United States Patent
Bostrom et al.

(10) Patent No.: US 7,277,422 B2
(45) Date of Patent: Oct. 2, 2007

(54) PROXY MODEM FOR VOICE OVER INTERNET PROTOCOL BASED COMMUNICATION SYSTEM

(75) Inventors: Kevin L. Bostrom, Naperville, IL (US); David G. Terebessy, Oak Park, IL (US); Judd O. Wilcox, Yorkville, IL (US); George Paul Wilkin, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1077 days.

(21) Appl. No.: 10/244,619

(22) Filed: Sep. 16, 2002

(65) Prior Publication Data

US 2004/0052243 A1 Mar. 18, 2004

(51) Int. Cl.
*H04L 12/66* (2006.01)
(52) U.S. Cl. ............... 370/352; 370/401; 375/222
(58) Field of Classification Search .............. None
See application file for complete search history.

(56) References Cited

U.S. PATENT DOCUMENTS

| | | | |
|---|---|---|---|
| 2002/0064137 A1* | 5/2002 | Garakani et al. | 370/278 |
| 2003/0123097 A1* | 7/2003 | Fruth | 358/400 |
| 2003/0123466 A1* | 7/2003 | Somekh et al. | 370/401 |
| 2006/0133358 A1* | 6/2006 | Li et al. | 370/352 |

* cited by examiner

*Primary Examiner*—Duc Ho

(57) ABSTRACT

In a packet data communications system (100) where a customer premises (120) has only a packet-based connection, a proxy modem (200) is provided at the customer premises to connect to devices that send and receive modulated transmissions, e.g., facsimile, modem, and TDD/TTY. The proxy modem demodulates the modulated transmissions (208), organizes the resulting digital signal into a packet (210) and forwards the packet over a packet network (104, 106). Another proxy modem (200) that connects to the packet network and to a telephony network (110) receives the packets from the packet network. The packets are re-organized into a digital signal that is then modulated and forwarded over the telephony network to a destination. Use of the proxy modems in the network prevents unnecessary digitizing of modulated transmissions, which slows transmission and introduces errors.

7 Claims, 4 Drawing Sheets

PROXY MODEM FOR VOICE OVER INTERNET PROTOCOL BASED COMMUNICATION SYSTEM

FIELD OF THE INVENTION

The present invention relates generally to telephony services, and in particular, to a method and apparatus that provides a virtual or proxy modem for modulated services in an Internet protocol communication system.

BACKGROUND OF THE INVENTION

Voice over Internet protocol (VoIP) telephone services are known. Such systems allow voice calls using Internet Protocol ("IP") networks such as the Internet as an alternative to traditional public switched telephone networks ("PSTN"). Unlike the PSTN, which is circuit-switched, the Internet is packet-switched. As such, communications on the Internet is accomplished by transmitting and receiving packets of data. In addition to data, each packet contains a destination address to ensure that it is routed correctly. The format of these packets is defined by the IP. One type of allowable data is encoded, digitized voice, termed voice over IP (VoIP). VoIP is voice that is packetized as defined by the Internet protocol, and communicated over the Internet for telephone-like communication. Individual VoIP packets may travel over different network paths to reach the final destination where the packets are reassembled in correct sequence to reconstruct the voice information.

With the advent of VoIP services, many current proposals suggest that no analog telephone connection to the public switched telephone network be provided at a customer premises. Instead a packet network connection is provided at the customer's premises. For example, iMerge, a solution in IP and TDM transport formats, available from AG Communications of Phoenix, Ariz., transports voice or data from and to a customer's premises via a fiber-to-the-home network or a cable network that interfaces to a managed IP network. The managed IP network is coupled to the public switched telephone network via a gateway, such as an IP to GR-303 gateway. The equipment at the customer's premises, e.g., telephones, connect to the fiber-to-the-home network or cable network via an analog-to-IP gateway with multiple ports that support multiple directory numbers and line terminations. Where the customer's equipment uses a modulated data transmission, for example, a modem, fax or TDD/TTY terminal, the lack of an analog telephone connection from and to the home, requires that the modulated data transmission be digitized (re-digitized) at the analog-to-IP gateway, prior to transmission over the managed IP network. The digitized modulated data transmissions are eventually converted back to a modulated data transmission at a point where the packet network connects to a circuit-switched telephone connection. Unfortunately, the extra digitizing of the modulated transmission at the customer's premises and the subsequent packet transmission and conversion back to a modulated format causes undesirable errors in the modulated transmission that affect the true and attainable data rate and bandwidth for the connection. This is due to delay, clocking mismatches, packet drop outs and the like.

Therefore, a need exists for an improved method and apparatus for supporting modulated transmission where only an IP connection is provided at a customer's premises.

SUMMARY OF THE INVENTION

The need is met and an advance in the art is made by the present invention, which provides a proxy or virtual modem connection to prevent unnecessary encoding and transcoding of a modulated transmission from a customer premises device that directly accesses a packet network.

In accordance with one aspect of the present invention, a method is provided for transmitting a modulated signal over a packet network. The method includes the step of receiving a modulated signal, for example, an analog modem signal that is modulated in conformance with a particular protocol. The modulated signal is demodulated with reference to the protocol to produce a demodulated digital signal. The demodulated digital signal is packetized, that is, organized into a packet. The packet is transmitted over a packet network. The packet is then received and the demodulated digital signal is recovered from the packet. The demodulated digital signal is then modulated in accordance with the particular protocol to produce a virtual modulated signal. The virtual modulated signal is then transmitted over a telephone network.

In another aspect of the invention, prior to the step of receiving the modulated signal, data is received identifying a destination for a data call. Then, a database query is performed with the data identifying the destination to determine a virtual modem location associated with the destination. The packet is sent to the virtual modem location associated with the destination via a packet network. The packet is then received at the virtual modem location associated with the destination and, at that location, converted into the virtual modulated signal that is then transmitted over a telephone network.

In accordance with another aspect of the invention, a proxy modem for use in a packet data communications system is provided. The proxy modem includes a first processor that receives a modulated signal that is modulated in accord with a certain protocol. The first processor demodulates the modulated signal with reference to the certain protocol to produce a demodulated digital signal. The first processor then packetizes the demodulated digital signal into a packet and transmits the packet over a packet network. A second processor then receives the packet and recovers the demodulated digital signal from the packet. The second processor then modulates the demodulated signal in accordance with the certain protocol to produce a virtual modulated signal. The virtual modulated signal is then sent over a telephone network.

DESCRIPTION OF THE PREFERRED EMBODIMENTS

Figure 1:
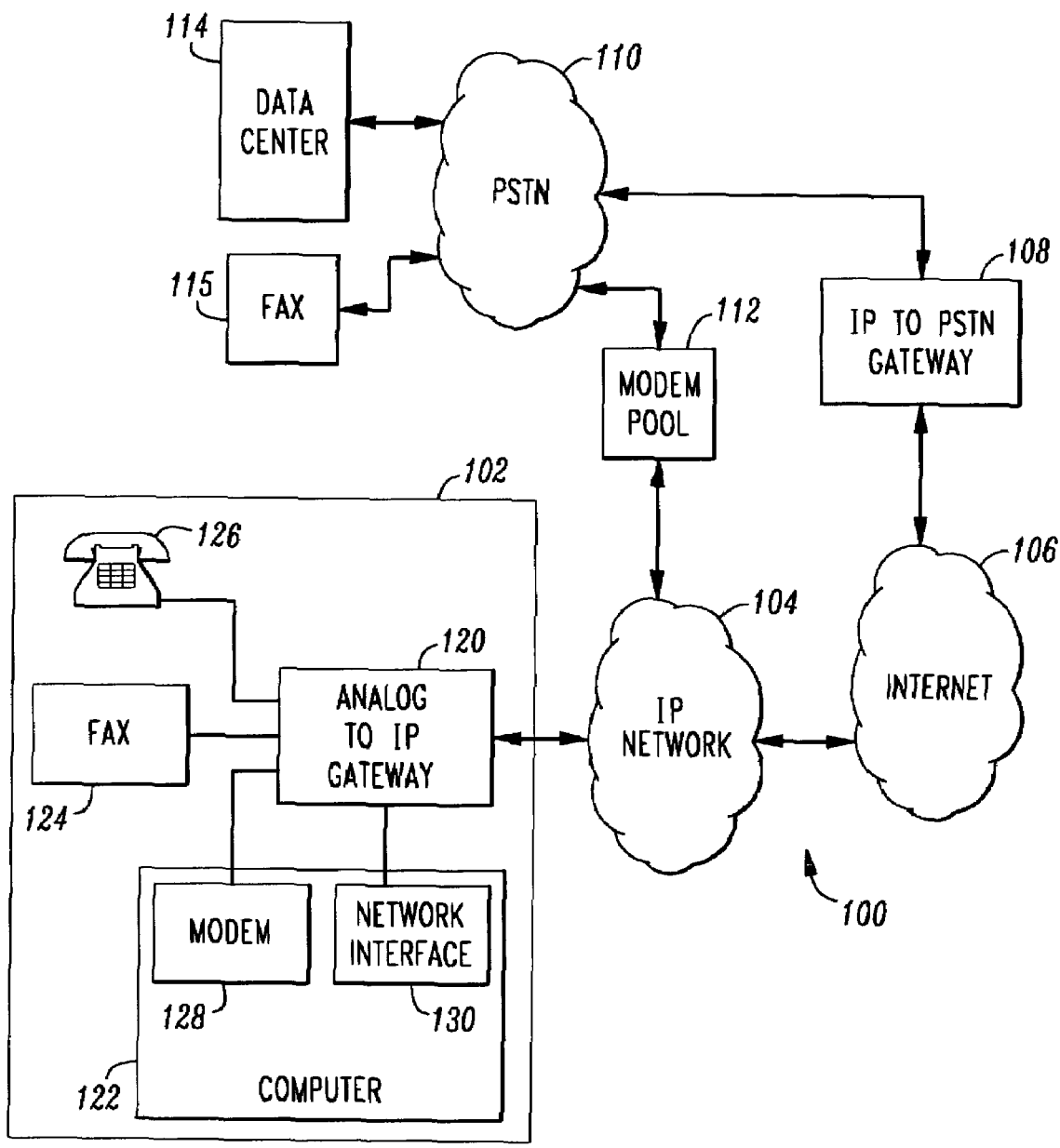
FIG. 1 is a block diagram of a communications system that provides a proxy modem for voice over Internet protocol (VoIP) telephone services in accordance with the present invention.

FIG. 1 is a block diagram of a communications system 100 that provides a proxy modem for voice over Internet protocol telephone services in accordance with the present invention. Communications system 100 includes a customer premises 102. Customer premises 102 is directly connected to IP network 104. Notably, customer premises 102 does not have a traditional circuit-switched telephony interconnection to the public switched telephone network. Instead, customer premises 102 has a direct connection to IP network 104. The direct connection is preferably a fiber-to-the-home network or cable network. Analog-to-IP gateway 120 interfaces with IP network 104. Inside the customer premises 102, analog-to-IP gateway 120 provides interfaces to a traditional telephone 126, a facsimile machine 124 and a computer 122. Computer 122 actually has two connections to analog-to-IP gateway 120. The first connection is through modem 128. The second connection is a network connection to a network interface 130 of computer 122. Other connections to analog-to-IP gateway 120 are contemplated, including a connection to a TDD/TTY terminal.

Analog-to-IP gateway 120 provides an interface for traditional telephone connections at the customer premises 102. In particular, telephone 126 connects to analog-to-IP gateway 120 for voice communications. In accordance with traditional voice over IP services, analog voice received from telephone 126 is digitized and placed in packets to be sent over IP network 104. Also, analog-to-IP gateway 120 has analog phone connections for attaching to fax 124 and modem 128. In accordance with traditional voice over IP services, as discussed above, analog modulated transmissions from fax 124 and modem 128 are digitized and placed into packets in a manner similar to the treatment of voice from telephone 126. As discussed above, this process introduces undesirable errors in the modulated transmissions. As discussed further below, analog-to-IP gateway 120 is modified in accordance with the present invention to treat modulated signals, such as signals from fax 124 and modem 128 in a different manner to facilitate better data communications. In addition, and in accordance with another aspect of the invention, computer 122 uses network interface 130 to emulate a modem such that a signal to be modulated is sent using analog-to-IP gateway 120 without extra digitizing of the modulated signal to conform to an IP network protocol.

IP network 104 provides access to and from many other communications systems. In particular, as shown in FIG. 1, IP network 104 is coupled to Internet 106. IP network 104 is preferably a privately managed IP network. IP network 104 is coupled to modem pool 112. Modem pool 112 is coupled to the public switched telephone network (PSTN) 110. Internet 106 is coupled to IP-to-PSTN gateway 108. Modem pool 112 converts from an IP network to a modem protocol suitable for the public switched telephone network and vice versa. Similarly, IP-to-PSTN gateway 108 converts from an IP protocol to a protocol suitable for the public switched telephone network, and vice versa. In FIG. 1, a data center 114, such as a data center for a pool of computers, and a fax 115 are shown connected to PSTN 110. Of course, any devices capable of connecting to the public switched telephone network may connect to PSTN 110.

As discussed above, analog-to-IP gateway 120 is modified in accordance with the present invention such that the modulated transmissions received by analog-to-IP gateway 120 are not unduly digitized in a manner to cause undesirable errors. Also, a network element that converts from an IP protocol to a PSTN protocol is modified in accordance with the invention to modulate previously modulated signals received from analog-to-IP gateway 120 in accord with a proper protocol. For example, a transmission from fax 124 to fax 115 is enhanced over prior art transmissions. Similarly, transmissions between modem 128 and a data center 114 are enhanced over prior art transmissions. More specifically, modulated transmissions received by analog-to-IP gateway 120 from fax 124 or modem 128 are not digitized in the manner that voice signals are digitized, as if received from, for example, telephone 126. Instead, the modulated transmissions are demodulated in analog-to-IP gateway 120 according to the protocol used to modulate the signals to thereby produce a demodulated digital signal. It will be appreciated by those skilled in the art that this demodulated signal is more accurate than a digitized version of the modulated signal. The demodulated digital signal is then organized into packets that are transmitted to IP network 104. When the packets of the demodulated digital signal reach a network element that will send the communications over a public switched telephone network connection, the demodulated signal is modulated in accordance with the proper protocol and that analog signal is then transmitted over the telephone connection. The network elements shown in FIG. 1 that transmit over a public switched telephone connection from an IP connection include modem pool 112 and IP-to-PSTN gateway 108.

Figure 2:
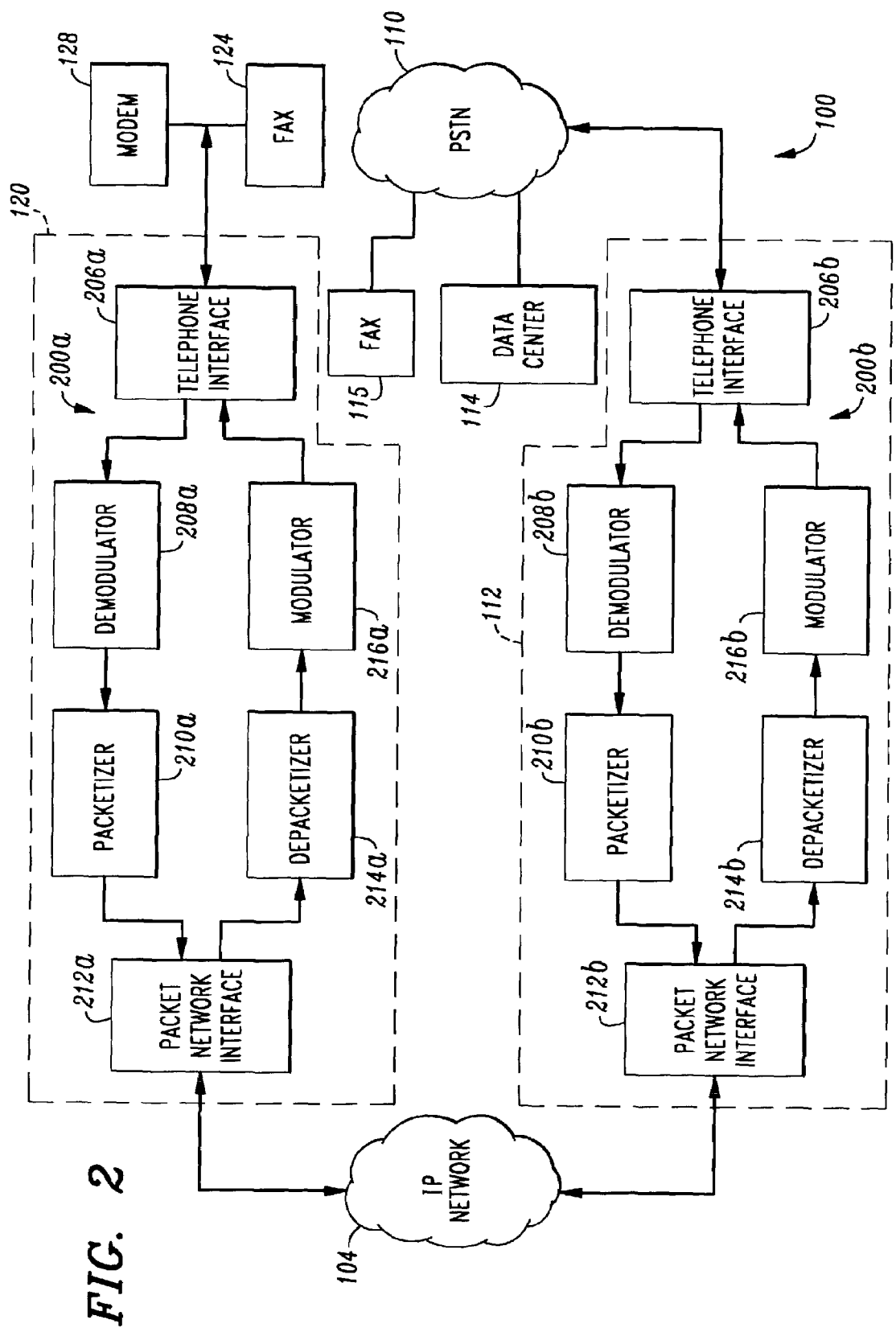
FIG. 2 is a block diagram illustrating proxy modem communications in accordance with the present invention.

FIG. 2 is a block diagram partially showing communications system 100, including further details of analog-to-IP gateway 120 and modem pool 112. In particular, a block diagram of a proxy modem 200a in analog-to-IP gateway 120 is shown. Similarly, a proxy modem 200b in modem pool 112 is shown. The proxy modems are substantially similar and hence, the same reference numerals are used to designate like parts, except that an alphabet (a or b) following the reference numeral distinguishes whether the reference is associated with analog-to-IP gateway 120 or modem pool 112. Hereinafter, a reference to a reference numeral without the trailing alphabet refers to all occurrences of the designated item. In contrast, the designation to the reference numeral and alphabet refers to the specific instance of that item.

Proxy modems 200 include a telephone interface 206. Telephone interface 206 provides a connection to a telephony device for the public switched telephone network. The interface supported may vary from a two-line interface to a T1 network interface or any other circuit-switched telephony interface.

Modulated transmissions received by telephone interface 206 are demodulated by demodulator 208. Demodulator 208 reproduces the signal that was originally modulated by implementing an inverse of the modulation protocol used to modulate the signal. For example, for a modulated communication from fax 124, demodulator 208a provides an inverse of the fax protocol to produce a digital demodulated signal representative of the fax transmission.

The digital demodulated signal produced by demodulator 208 is then organized into packets by packetizer 210. The packets from packetizer 210 are sent over a packet network via a packet network interface 212.

After traveling across a packet network, packets of the digital demodulated signal are received as packets by packet network interface 212. Depacketizer 214 organizes the packets to recreate the digital demodulated signal. Modulator 216 receives the digital demodulated signal and modulates the demodulated digital signal in accordance with the proper protocol and sends the modulated signal over telephone interface 206.

By way of example, modem 128 sends and receives data to data center 114 via the following procedure. A modulated signal produced by modem 128 is received by telephone interface 206a. Telephone interface 206a knows that it is receiving a modulated signal from modem 128 either because of a port designated on analog-to-IP gateway 120 for receiving modulated transmissions, or telephone interface 206a detects that the signal is modulated via digital signal analysis of the modulated signal itself. Telephone interface 206a sends the modulated signal to demodulator 208a. In accordance with, and in reference to, the modem protocol used to modulate the signal, demodulator 208a demodulates the signal to produce a digital demodulated signal. The digital demodulated signal is sent to packetizer 210a, which organizes the digital demodulated signal into packets that are forwarded over IP network 104 via packet network interface 212a. The packets travel across IP network 104 to packet network interface 212b. The packets are organized into a digital demodulated signal by depacketizer 214b. The digital demodulated signal is then modulated by modulator 216b to produce an analog modulated signal that is sent to the public switched telephone network by telephone interface 206b. The modulated signal is then routed through the public switched telephone network to data center 114. Data from data center 114 follows an analogous path over PSTN 110 to telephone network interface 206b. This analog modulated signal is then demodulated by demodulator 208b and organized into packets by packetizer 210b prior to being forwarded over IP network 104 by packet network interface 212b. Packet network interface 212a receives the packets and re-organizes the packets into a digital demodulated signal using depacketizer 214a. The digital demodulated signal is then modulated by modulator 216a to produce an analog signal that is sent over telephone interface 206a to modem 128.

Figure 3:
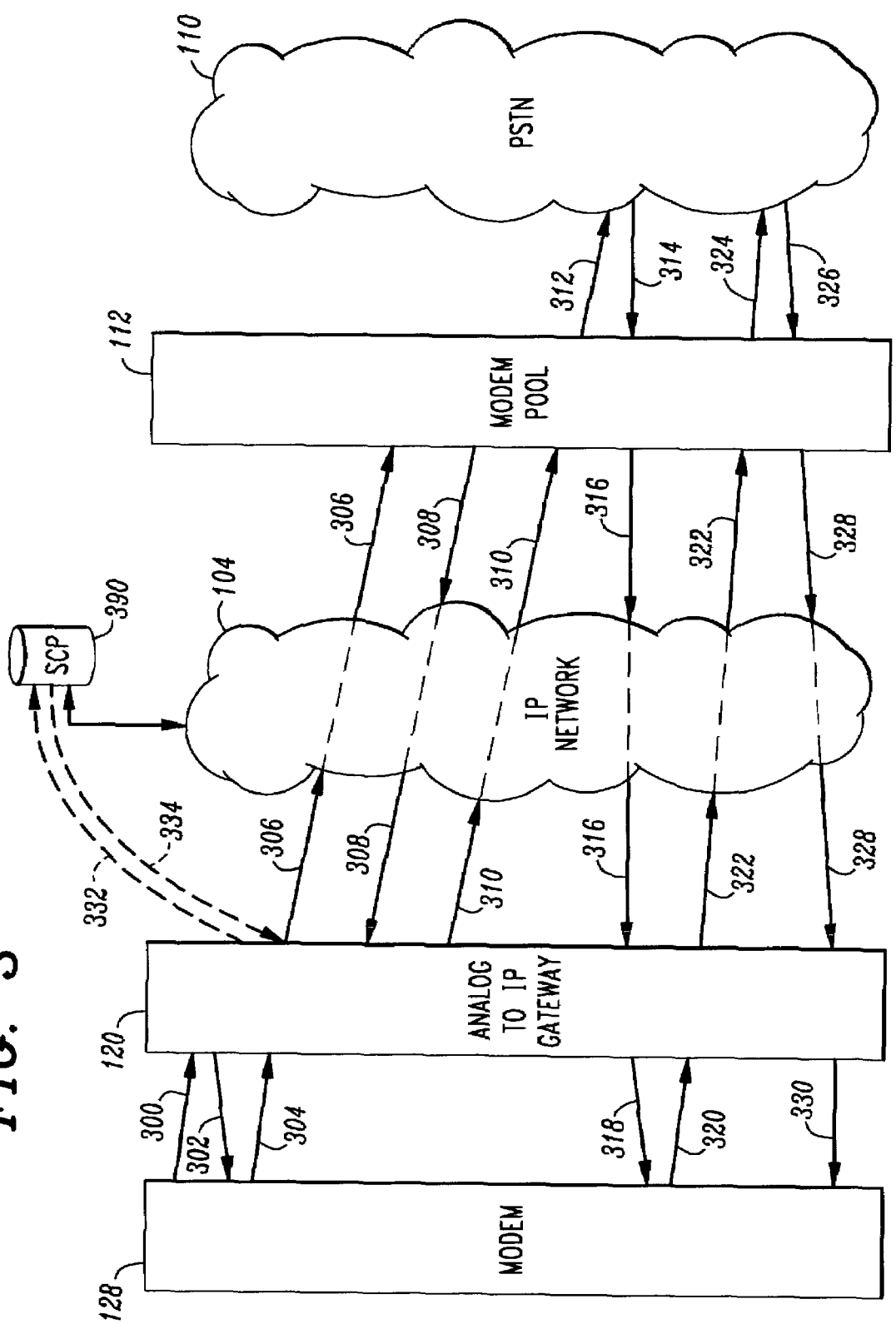
FIG. 3 is a flow chart illustrating the flow of a data call in accordance with the present invention.

FIG. 3 is a flow diagram illustrating the flow of a data call that includes a modulated transmission in accordance with the present invention. In particular, FIG. 3 shows modem 128, analog-to-IP gateway 120, IP network 104, modem pool 112, and PSTN 110. Lines with an arrow, which are designated by reference numerals, are also shown in FIG. 3 to illustrate the steps and procedures used to accomplish the data call in accordance with the present invention. An example operation in accordance with the invention is described below with reference to FIG. 3.

First, modem 128 goes off-hook to initiate the beginning of a call in the traditional manner (300). In response to the off-hook indication, analog-to-IP gateway 120 returns a dial tone to modem 128, if resources are available to initiate the call (302). After receipt of the dial tone, modem 128 sends digits representative of the number to be called for the data call (304). These procedures represent the traditional method of establishing an analog phone call and apply not only for modem 128, but also for phone calls placed using telephone 126 or fax 124.

After analog-to-IP gateway 120 has the digits representing the number to be called, the analog-to-IP gateway 120 can proceed to set up the call over the packet network to the public switched telephone network. This requires determining an IP address for the final packet device that directly connects to the public switched telephone network to complete the call. In this example, modem pool 112 connects the call to the PSTN, and therefore, the IP address of modem pool 112 is the final packet destination. First, a setup message is sent from analog-to-IP gateway 120 to modem pool 112 to initiate communication with the modem pool (306). Modem pool 112 then sends an acknowledgement message back to analog-to-IP gateway 120 to indicate that setup is properly established (308). In response to the acknowledgement, analog-to-IP gateway 120 sends digits for the phone call to modem pool 112 (310). Upon receipt of the phone number for the final destination, modem pool 112 sets up the circuit-switched or telephony connection to the destination attached to the public switched telephone network 110.

In order to connect to the destination connected to the public switched telephone network 110, modem pool 112 send digits representing the telephone number associated with the destination (312). If the destination is available, then the call is answered (314). When the modem pool 112 detects that the phone call is answered, modem pool 112 sends an acknowledgement to analog to IP gateway 120 (316). The acknowledgement indicates that the phone call has been established with the destination, including a path through a packet network.

Analog-to-IP gateway 120 forwards the acknowledgement and any data for the connection over to modem 128 (318). Modem 128 responds in a manner consistent with answering a traditional analog phone call by returning tones to establish the communication over the call (320).

At this point, a communications path for the data call is established between modem 128 and the final destination attached to the public switched telephone network 110. The path shown via lines 320, 322, 324, 326, 328, 330 are representative of the continuous back and forth sending of data between the participants of the data call. Path 320 is an analog path that includes a modulated transmission. Path 322 is a packet transmission in accordance with the present invention. Data on path 322 is formed from a modulated transmission processed by proxy modem 200 of analog-to-IP gateway 120. Path 324 is a telephony connection that carries a modulated transmission processed by a proxy modem 200 of modem pool 112. Path 326 carries a modulated transmission over a telephony connection to modem pool 112. Path 328 is a packet connection that, in accordance with the invention, is processed by proxy modem 200 of modem pool 112. Path 330 is a telephony connection back to modem 128. Data on path 330 is processed by proxy modem 200 of analog-to-IP gateway 120.

In accordance with a preferred option according to the invention, after analog-to-IP gateway 120 receives the dialed digits for the call (304), analog-to-IP gateway 120 performs a database look-up, for example, using a service control point (SCP) database 390, or the like. The SCP database is accessible via any available network. The SCP database provides a number or identification, typically an IP address, for the destination packet device that makes the connection to the telephone network. Using a database look-up advantageously permits flexible selection of a destination device that connects to the PSTN. Selection may be based on rate, geographical location, time, cost or another parameter.

Figure 4:
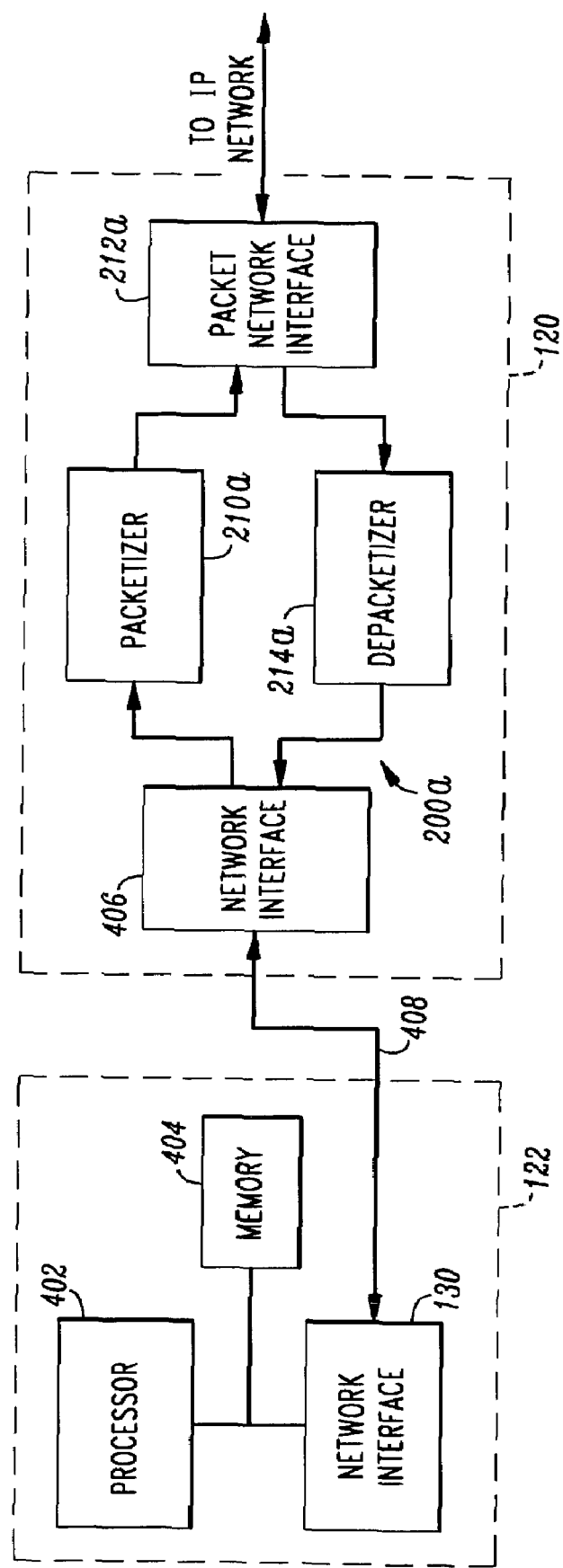
FIG. 4 is a block diagram of an alternate embodiment of a proxy modem for use with a computer in accordance with the present invention.

FIG. 4 is a block diagram showing an alternate embodiment of the present invention particularly suited for modulated transmissions originating from a computer. In particular, FIG. 4 shows in greater detail, the network connection 408 between computer 122 and analog-to-IP gateway 120. As discussed further below, in accordance with this aspect of the invention, rather than analog-to-IP gateway 120 receiving modulated transmissions from computer 122, analog-to-IP gateway 120 receives digital data that is to be modulated over network interface 408 and then portions of proxy modem 200 in analog-to-IP gateway 120 are used to communicate the transmissions. For the return path, modulated transmissions received from a packet network by proxy modem 200 in analog-to-IP gateway 120 are not modulated prior to being sent to computer 122, but instead are sent as digital data over network connection 408 to computer 122.

Computer 122 includes a processor 402, a memory 404 and a network interface 130. Processor 402, memory 404 and network interface 130 are coupled together for communication in any known manner. Processor 402 is any suitable microprocessor, micro-controller, digital signal processor or combination of these. Any network connection and corresponding network interface is employed, for example, Ethernet. Indeed a simpler connection such as a parallel or serial connection, for example, USB or Firewire, may be employed.

Processor 402, in conjunction with memory 404, executes a stored program that simulates a modem in accordance with the present invention. The modem emulation program communicates with other applications running on computer 122 to provide an interface consistent with a physical modem and a software driver for the modem. The modem emulation program receives data from other applications that are to be sent as a modulated transmission. Data to be modulated by the emulation program is forwarded via network interface 130 and network connection 408 to network interface 406 of analog-to-IP gateway 120.

A companion modem emulation program runs on a processor on analog-to-IP gateway 120. This program interfaces with network interface 406 to receive the data to be modulated from network connection 408. Rather than modulate that data, in accordance with the invention, the data to be modulated is forwarded to packetizer 210a, where it is organized into packets and forwarded to an IP network via packet network interface 212a. The packets are ultimately received by a device that is connected to the public switched telephone network, for example modem pool 112. At the device connected to the public switched telephone network, the data is modulated and forwarded over the public switched telephone network. For example, data to be modulated from computer 122 is received by packet network interface 212b of modem pool 112. That data is then depacketized by the depacketizer 214b and modulated by modulator 216b. Then the modulated analog data is forwarded over telephone interface 206b to public switched telephone network 110 and ultimately a destination connected to PSTN 110, for example, data center 114.

Modulated transmissions that are sent to computer 122 are subjected to an inverse process in accordance with the present invention. In particular, packetized modulated data, such as that output by packet network interface 212b of modem pool 112, is received by packet network interface 212a. That data is then re-organized into digital data by depacketizer 214a. That data is then forwarded to network interface 130 of computer 122 via network interface 406 and network connection 408. The modem emulation program running on computer 122 then provides the received data to applications communicating with the modem.

Proxy modems are provided in a communications system in accordance with the invention to accommodate modulated transmissions. Advantageously, unnecessary digitizing and re-digitizing of the modulated transmission is avoided. This facilitates faster more reliable modulated transmissions within an Internet protocol communications system.

Whereas the present invention has been described with respect to specific embodiments thereof, it will be understood that various changes and modifications will be suggested to one skilled in the art and it is intended that the invention encompass such changes and modifications as fall within the scope of the appended claims.

The invention claimed is:

1. A method for transmitting a modulated signal over a packet network, the method comprising the steps of:
    receiving the modulated signal that is modulated in conformance to a protocol;
    demodulating the modulated signal with reference to the protocol to produce a demodulated digital signal;
    packetizing the demodulated digital signal into a packet;
    transmitting the packet over a packet network;
    receiving the packet;
    recovering the demodulated digital signal from the packet;
    modulating the demodulated signal in accordance with the protocol to produce a virtual modulated signal; and
    transmitting the virtual modulated signal over a circuit-switched telephone network;
    receiving data identifying a destination for a data call; and
    performing a database query with the data identifying the destination to determine a virtual modem location associated with the destination; and
    wherein the step of transmitting the packet over a packet network includes the step of transmitting the packet over a packet network to the virtual modem location associated with the destination;
    wherein the step of receiving the packet includes the step of receiving the packet at the virtual modem location associated with the destination; and
    wherein the step of transmitting the virtual modulated signal includes transmitting the virtual modulated signal over a circuit-switched telephone network to the destination.

2. The method of claim 1 wherein the step of receiving the modulated signal includes the step of detecting that a signal is modulated in conformance with the protocol.

3. The method of claim 1 wherein the protocol is chosen from the group consisting of a modem protocol, a facsimile protocol, and a TDD/TTY protocol.

4. A proxy modem for use in a packet data communication system, the proxy modem comprising:
    a first processor that:
        receives a modulated signal that is modulated in conformance to a protocol;
        demodulates the modulated signal with reference to the protocol to produce a demodulated digital signal;
        packetizes the demodulated digital signal into a packet; and
        transmits the packet over a packet network;
    a second processor that:
        receives the packet;
        recovers the demodulated digital signal from the packet;
        modulates the demodulated signal in accordance with the protocol to produce a virtual modulated signal; and
        transmits the virtual modulated signal over a circuit-switched telephone network;
    wherein the first processor is in an analog-to-IP gateway and the second processor is in a modem pool.

5. The proxy modem of claim 4 wherein the modulated signal is received over a port designated to receive modulated signals that conform to the protocol.

6. A proxy modem comprising:
   means for receiving a packet that contains a digital signal that is formatted to be modulated in accordance with a protocol;
   means for modulating the digital signal in accordance with the protocol to produce a modulated signal;
   means for transmitting the modulated signal over a circuit-switched telephone network;
   wherein the proxy modem is housed in an analog-to-IP gateway and the digital signal that is formatted to be modulated in accordance with the protocol is received from a computer.

7. The proxy modem of claim 6 further comprising:
   means for receiving the digital signal formatted for modulation in conformance with the protocol; and
   means for transmitting the digital signal over a packet network as a packet.

* * * * *